June 22, 1943.  B. M. BARNITZ  2,322,501
AUTOMATIC TEMPERATURE CONTROL INSTRUMENT
Filed July 30, 1940
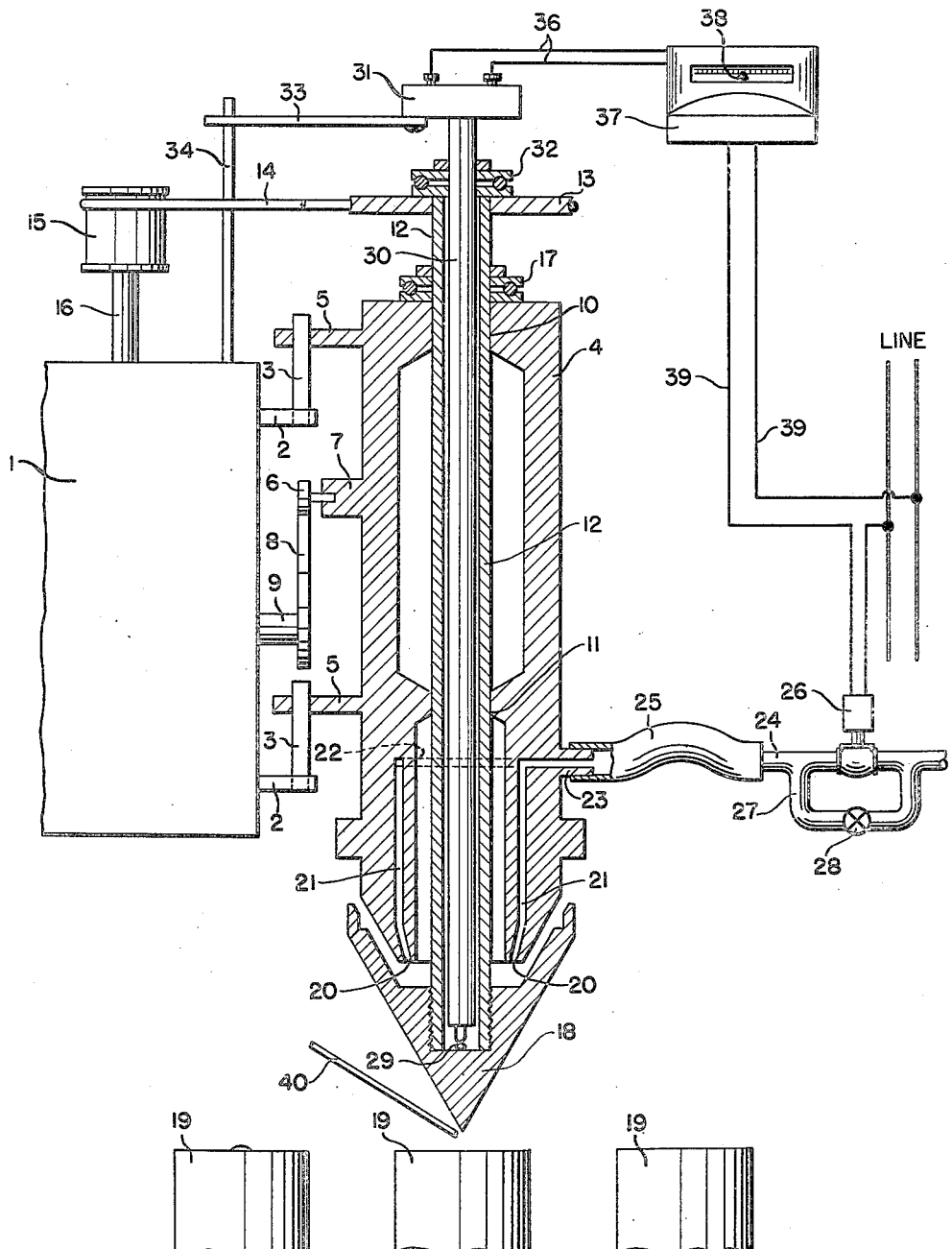
INVENTOR.
BLAIR M. BARNITZ
BY
ATTORNEY Patented June 22, 1943

2,322,501

UNITED STATES PATENT OFFICE 2,322,501

AUTOMATIC TEMPERATURE CONTROL INSTRUMENT

Blair M. Barnitz, Los Angeles, Calif., assignor to The Brown Instrument Company, Philadelphia, Pa., a corporation of Pennsylvania Application July 30, 1940, Serial No. 348,601

5 Claims. (Cl. 113—91)

The present invention relates to automatic control systems and more particularly to a control system in which the soldering tip of a can soldering machine is kept at a constant temperature.

In the production of evaporated milk it is customary to place the ends of the can on the body before the can is filled. One of the ends is provided with a small opening through which the can is filled and this opening is later sealed with a drop of solder. If the tip of the soldering iron is not hot enough the opening will not be properly sealed with the result that the can must be rejected. On the other hand if the soldering tip is too hot the solder may be melted to such an extent that, even though a perfect seal is obtained, a small globule of solder will drop into the can. Such cans must also be rejected, and as it is difficult to determine if a drop of solder is in the can the expense of testing each can is large. The need for a temperature control for the tip is, therefore, obvious.

In most can filling machines the soldering tip has both reciprocating and rotary motion, the former is used to move the soldering tip into and out of engagement with the cans as they are moved past the closing position, and the latter motion is used so that a better seal may be made. Great difficulty has been encountered in measuring the temperature of the soldering tip because its movement has made the keeping of a temperature responsive element in engagement therewith almost out of the question. It has also been difficult, in the past, to maintain the temperature of the tip at the proper degree because of the lack of any suitable means to measure its temperature.

It is an object of my invention to overcome the above mentioned difficulties by providing a simple and effective means for measuring and controlling the temperature of the soldering tip in a can filling machine. It is a further object of my invention to measure the temperature of a soldering tip by means of a thermocouple that is continuously held in engagement with the tip. It is a further and broader object of my invention to control the temperature of a moving object.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

In the drawing:

The single figure of the drawing shows, partly in section, the manner in which a soldering tip incorporating my invention is constructed and controlled.

Referring to the figure there is shown a frame 1 of a can soldering machine, which frame encloses the various driving means that are needed for such a machine. Projecting from the side of the frame are extensions 2 which are provided with pins 3 that are used to slidably support a tubular bracket 4. This bracket carries all the soldering mechanism and is formed on one side with lugs 5 that receive the pins 3. The bracket is reciprocated with respect to the frame 1 by means of a cam roller 6 that is rotatably supported in another lug 7. This cam roller is engaged by cam 8 that is mounted on and driven by a constantly rotating shaft 9, from mechanism that is enclosed in the frame 1.

The interior of the bracket 4 is formed with bearing surfaces 10 and 11 which are used to guide a soldering tip supporting tube 12. This tube is rotated by means of a pulley 13 attached to its upper end and a belt 14 that is driven from another pulley 15 which is rotated by a constantly driven shaft 16 extending from the frame 1. The tube 12 is maintained in the proper axial position with respect to the bracket 4 so that a soldering tip 18, or "tipper" as it is more often called, which is attached to the lower end of the tube is properly positioned with respect to the lower end of the bracket. The arrangement is such that the bracket 4 carrying the tipper is reciprocated while the tipper is rotated with respect thereto. This permits cans 19 to be successively moved to a position under the tipper 18, at which time the rotating tipper is moved into engagement with the can to seal an opening therein. The tipper is then moved upwardly out of the way so that another can may be moved into soldering position.

Heat is supplied to the tipper 18 by means of burners 20 which are formed in the lower end of bracket 4. These burners are supplied with gas through passages 21 which connect at their upper ends with a manifold 22 that is in turn provided with an inlet opening 23. Gas is supplied to the inlet from a pipe 24 by means of a flexible connection 25 extending between the pipe and the inlet. This connection permits the bracket to be reciprocated without interrupting the supply of gas. The gas line 24 is provided with a valve 26, shown herein as a solenoid valve, although it could just as well be any other type of automatically controlled valve. Around the valve 26 is a by-pass 27 that has a hand valve 28 in it.

The temperature of the tipper 18 is measured by means of a thermocouple 29 that has its lead wires extending through an insulating tube 30 to the upper end of which is attached a terminal box 31. The insulating tube 30 reciprocates with and is properly positioned with respect to the tube 12 by means of a thrust bearing 32 and is held in such position that the hot junction of the thermocouple 29 is engaged with the inside surface of the tipper 18. The thermocouple is prevented from rotating by means of a projection 33 that extends from the terminal block 31 which projection is provided with an opening that slidably receives a rod 34 that is attached to the frame 1.

The temperature of the tipper as measured by the thermocouple is indicated by a pyrometer 37 which is connected to the thermocouple by means of flexible wires 38. This pyrometer can be of any desired type, but is shown herein as having an indicating pointer 38 that moves in front of a scale to indicate the temperature of the tipper 18. Located in this pyrometer is electrical control apparatus that is operated in any well known manner to control the opening of valve 26.

In this case, pyrometer switches serve to close a circuit from the line through conductors 39 to energize and open the solenoid valve 26 as the temperature of the tipper goes below some desired value. If the tipper becomes too hot the valve 26 is deenergized to cut off the supply of gas.

In the operation of the system the valve 28 is adjusted to provide a minimum supply of gas to the burners 20. The rotating tipper is then raised and lowered into engagement with the cans 19 and as it travels up and down it places solder from the supply 40 over the opening in the top of the can to close the same. The thermocouple 29 and its insulating tube 30 reciprocate with the tipper so that the thermocouple will at all times accurately respond to the temperature of the tipper. If the temperature of the tipper 18 becomes so low that a proper seal cannot be made on the cans, then the instrument 37 operates to open valve 26 and permit a larger supply of gas to go to the burners to increase the tipper temperature. If, on the other hand, the temperature of the tipper becomes so great that some drops of solder may fall through the opening in the top of the can as it is being sealed, the instrument 37 will cause the valve 26 to be deenergized to reduce the supply of gas in the burners 20. In this manner the temperature of the tipper 18 is maintained at a value which will permit proper sealing of the cans 19 without the danger of letting some drops of solder get into them. Cooperation between projection 33 and rod 34 prevent the thermocouple from rotating while it is reciprocating with the tipper and wires 38 flex to permit the proper reciprocating movement of the various parts.

While I have described my invention as being applied to the soldering tip of a can filling machine, it will be obvious to those skilled in the art that a temperature measuring element mounted in the manner shown herein may be used to measure and control the temperature of any rotating object.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a can closing machine having a reciprocating and rotating soldering tip, the combination of means to measure and control the temperature of said tip comprising a temperature measuring element, means to mount said element in engagement with said tip for movement therewith in a reciprocating direction only, means to supply a heating medium to said tip, and means responsive to measurements made by said element to control the supply of heating medium.

2. In a can filling machine having a tipper supported by a tubular member for both rotation and reciprocation, said tipper having a central bore, the combination of a temperature responsive element received by said tipper in the bore thereof, means to maintain said element in a given axial position with respect to said tipper while the latter reciprocates, means to maintain said element against rotation with said tipper and means to indicate the temperature of said tipper as measured by said element.

3. In combination with a soldering tip, a support therefore, means to reciprocate said support, means to rotate said tip in said support, said tip being provided with an axial bore extending partially through the same, a temperature responsive element extending into said bore and engaging an end wall thereof, means to hold said element against rotation with said tip, a supply of heating fluid for said tip, control means for said supply, and means to operate said control means in response to measurements made by said element.

4. In a can closing machine, the combination of a soldering tip, means to reciprocate and to rotate said tip, said tip being provided with an axial bore terminating near one end thereof, a temperature responsive element placed in said bore, means to hold said element in said bore and against axial movement relative thereto, means to hold said element against rotation whereby said element will reciprocate with said tip but will not rotate with the same, a supply of heating medium for said tip, and means to control said supply of heating medium operated by said element.

5. In a can closing machine, the combination with a tipper having a hot end and an axial bore extending to a point adjacent said hot end, of means to reciprocate and rotate said tipper, a temperature responsive element extending in said bore and in engagement with the end thereof, a bearing supporting said element in fixed relation axial to said tipper whereby said element will reciprocate with said tipper, means cooperating with said element to constrain the latter from rotating with said tipper, said bearing acting to permit relative rotation between said element and tipper, an indicating and control instrument responsive to the temperature of said tipper as measured by said element, and means operated by said instrument to control the temperature of said tipper.

BLAIR M. BARNITZ.